3,475,328
TREATMENT OF HYDROCARBONS AND CATALYSTS THEREFOR
Thomas Nicklin, 39A Rochdale Road, Middleton, Manchester, England, and Frederick Farrington, 9 Cecil Ave., Sale, Cheshire, England
Continuation-in-part of application Ser. No. 432,822, Feb. 15, 1965. This application June 19, 1967, Ser. No. 646,834
Claims priority, application Great Britain, Apr. 6, 1964, 14,079/64
Int. Cl. C10g 29/16, 31/08; B01j 11/50
U.S. Cl. 208—243　　　　　　　　　　　　　　9 Claims

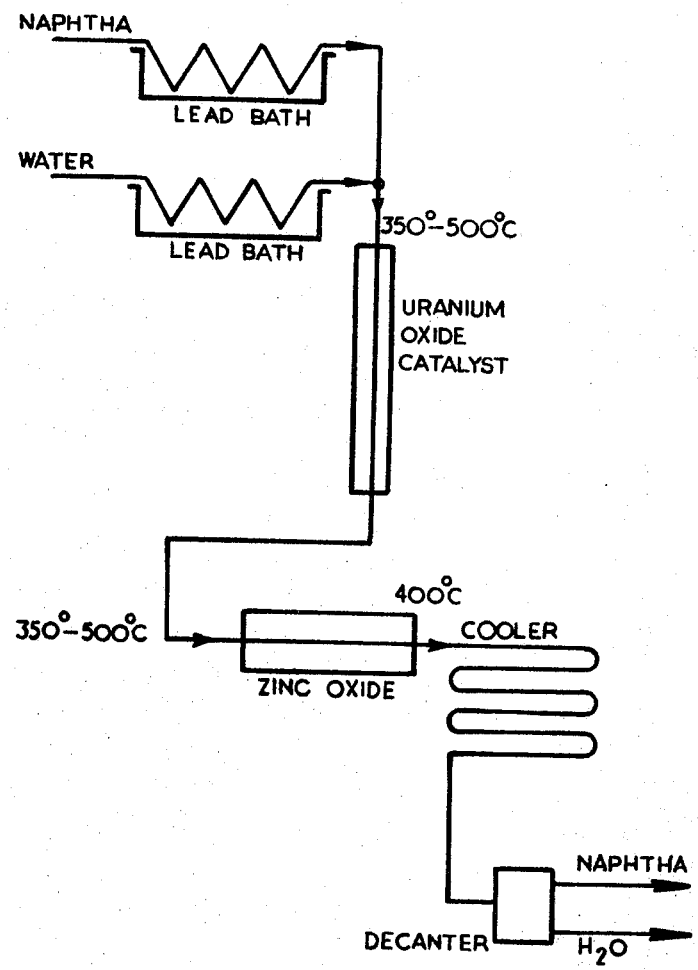

ABSTRACT OF THE DISCLOSURE

The invention is concerned with a process for removing organic sulphur compounds from hydrocarbons in the gas phase. One or more hydrocarbons are mixed with steam and passed in the vapour phase over a catalyst containing uranoso-uranic oxide and/or uranium trioxide supported on an inert carrier such as aluminium oxide. The reaction temperature is usually between 350° C. and 500° C., the pressure being atmospheric or higher. This invention relates also to the catalysts per se and to methods of producing the catalysts, which include thermal decomposition of uranium nitrate adsorbed on an inert carrier.

---

This invention relates to the treatment of hydrocarbons and in particular to the removal of sulphur compounds from hydrocarbons.

The present application is a continuation in part of our copending patent application Ser. No. 432,822 filed Feb. 15, 1965 now abandoned.

These are numerous processes in the chemical and petroleum industries where it is necessary to reduce the sulphur content of the hydrocarbon raw materials used to very low levels. Thus in the steam reforming of petroleum light fractions for the production of synthetic gas using a nickel catalyst sulphur contents of the order of 10 p.p.m. w./w. or less are required in the reacting mixture entering the reforming tube. Similarly, processes of catalytic reforming for the production of high octane fuels may require feedstocks of the order of 30 p.p.m.

The conventional method of removing organic sulphur compounds is either by acid washing, particularly where the sulphur content is very high, or reduction of the sulphur compounds to hydrogen sulphide by means of hydrogen in the presence of a catalyst. Sometimes it is necessary to carry out both these operations if the raw material has a very high sulphur content and the final application demands a very small one. Both these processes are expensive. The acid washing process requires the use of mineral acid and presents a difficult problem in regard to the disposal of the used acid. The second process requires a supply and compression of hydrogen and this can be an expensive procedure.

In out patent application Ser. No. 432,822, there is described and claimed a process in which organic sulphur compounds are removed from hydrocarbons by treating with steam at temperatures above 350° C. in the presence of a catalyst consisting of uranium oxide on an aluminium oxide support.

We have now found that the compounds uranoso-uranic oxide and also the compound uranium trioxide $UO_3$ have useful catalytic activity when dispersed on a support other than an aluminium oxide support. In particular, we have found that organic sulphur compounds may be removed from hydrocarbons in the vapour phase when heated with steam at elevated temperatures in the presence of uranoso-uranic oxide $U_3O_8$ and/or uranium trioxide disposed on a support other than alumina. Such carriers may, for example, include silica, kaolin, magnesium silicate, powdered brick, alkaline earth, metal oxides such as the oxides of magnesium, calcium, strontium and barium. Alternatively the support may consist of a mixture of two or more of the foregoing.

The term "uranoso-uranic oxide" is used herein to refer to the mixed oxide $U_3O_8$ which is also referred to in some publications as triuranium octa-oxide (see for example "Handbook for Chemical Society Authors," page 22, published by the Chemical Society in 1960).

It is to be understood that the term "organic sulphur compound" as used herein includes within its scope the compound carbon disulphide. Any carbon oxysulphide which is also present in the hydrocarbons would be removed under the reaction conditions of the present invention.

The temperature at which the desulphiding process of the invention may be carried out is usually in the range of 350° C. to 500° C., and preferably in the range of 420° C. to 480° C. The temperature or range of temperature used will depend upon the circumstances of the reaction, including the nature of the hydrocarbon product that is treated, the proportions of steam and hydrocarbon present and the rate at which they are passed through the reaction zone. In certain cases it may be possible to carry out the desulphiding reaction at temperature below below 350° C.

The desulphiding process using the catalysts of the present invention is applicable to feedstock containing aliphatic and/or aromatic hydrocarbons and mixtures thereof, and including petroleum distillates, light naphtha and heavy naphtha, refinery and coke oven gases. The proportion of steam used in relation to the hydrocarbon may vary between wide limits, e.g. from ½ to 6 lbs. per gallon of hydrocarbon. In general the preferred proportion is from 1 to 2 lbs. of steam for every gallon of hydrocarbon feedstock (in liquid form).

The uranoso-uranic oxide and/or uranium trioxide content of the catalyst may vary from 1 to 80 percent, preferably from 5 to 20 percent, and advantageously from 5 to 10 percent.

Certain supports have been found to be more useful than others. Some supports, notably those of acidic character such as silica, although providing effective catalysts for short runs, suffer from the disadvantage of tending to cause carbon to be deposited on them. The effectiveness or otherwise of a catalyst made using a particular support may be readily ascertained by simple trial and experiment. Although, in our experience, every stable support is defined below which we have tested has been found to be effective to a greater or lesser degree, we recognise that there may exist stable supports the use of which in conjunction with uranoso-uranium oxide and/or uranium trioxide would not be effective in carrying out the desulphiding process of this invention and no claim is made herein to any process using uranoso-uranic oxide and/or uranium trioxide supported on such a support.

The present invention is preferably concerned with the use of catalyst supports for the uranoso-uranic oxide which are stable, i.e. which are of suitable mechanical strength, do not melt or sinter or undergo chemical change (for example reduction) under the conditions of the desulphiding reaction, and which have a surface area that is not materially affected under such conditions.

According to one aspect of the present invention there is provided a catalyst effective in removing organic sulphur compounds from hydrocarbons in the vapour phase in the presence of steam at elevated temperatures which comprises uranoso-uranic oxide, $U_3O$, and/or uranium trioxide $UO_3$ and a catalyst support other than alumina.

The present invention further relates to a catalyst composition comprising a catalyst support and a uranium compound which at elevated temperatures such as are present under the conditions of the desulphiding reaction, will decompose to yield uranoso-uranic oxide and/or uranium trioxide deposited on the catalyst support. Such uranium compound may consist, for example, of a uranium salt such as uranium nitrate. Alternatively, the uranium compound may consist of a uranate unstable to heat, such as ammonium diuranate which under the conditions of the desulphiding reaction would deposit on the surface uranoso-uranic oxide and/or uranium trioxide.

The term "catalyst composition" is used herein to denote a precursor for uranoso-uranic oxide, $U_3O_8$, and/or uranium trioxide, $UO_3$. Thus the term covers a composition comprising a catalyst support and a uranium compound which will decompose at elevated temperatures to give the $U_3O_8$ and/or $UO_3$.

The present invention further relates to methods for the preparation of the catalysts and catalyst compositions of the invention.

According to one method of preparing the catalyst compositions and the catalyst, a compound of uranium that decomposes on heating to give uranoso-uranic oxide and/or uranium trioxide, for example, uranium nitrate, or uranium acetate, is dissolved in water and the catalyst support is added in powder form. The carrier may then be removed and heated to a temperature desirably below 500° C., and pelleted.

In another method, shaped pieces of the stable carrier are impregnated with a solution of a uranium compound as mentioned above and heated to a temperature desirably below 500° C. to form the uranoso-uranic oxide and/or uranium trioxide. The impregnation and heating may be repeated if necessary to ensure adequate coating of the carrier surface with uranoso-uranic oxide, and/or uranic trioxide.

In yet another method, mixtures comprising a uranium compound as mentioned above, and a fusible salt which on strong heating gives an oxide which constitutes a stable carrier, are heated together until they melt and then heated to a temperature desirably below 500° C. so as to decompose the uranium compound and the salt. The product is ground and pelleted.

It will be appreciated by those skilled in the art that where the temperature of the desulphiding process is in excess of 140° C. (at which temperature ammonium diuranate will begin to decompose to give $UO_3$ on the surface of the carrier) a stable carrier impregnated with a uranium compound which decomposes to give uranoso-uranic oxide $U_3O_8$ and/or uranium trioxide, $UO_3$ in that range of temperature will, if introduced into the reactioin space, yield a catalyst comprising a catalyst support and the said oxide. Accordingly the present invention embraces within its scope as novel articles of manufacture, the catalyst compositions which, under the said conditions, will yield such a catalyst.

Also included within the scope of the present invention is a process whereby organic sulphur compounds are removed from hydrocarbons in the vapour phase wherein the hydrocarbons are treated with steam at elevated temperatures in the presence of a catalyst which comprises uranium trioxide $UO_3$ and/or uranoso-uranic oxide, $U_3O_8$, and a support other than alumina. The uranium trioxide and/or uranoso-uranic oxide may be used alone on the support. Alternatively, the catalyst may consist of a support and uranium trioxide and/or uranoso-uranic oxide together with other constituents which, alone or in combination, have catalytic activity, such as, for example, nickel or cobalt or their oxides, and/or alkali metal compounds.

According to a method of practising the present invention, the catalyst is formed in the reaction space by introducing a catalyst precursor and thereafter converting the catalyst precursor in the active catalyst.

The hydrogen sulphide produced from the organic sulphur compounds can be removed from the treated hydrocarbon while it is still in the form of vapour subsequent to reaction. One method of removing the hydrogen sulphide is by washing with an aqueous solution of sodium vanadate and sodium salt of anthraquinone disulphonic acid as described in British Patent No. 948,270. Another method is to absorb the hydrogen sulphide by means of zinc oxide pellets.

The operation of the process according to the present invention is illustrated by reference to the flow sheet diagram set out in FIGURE 1 of the drawings appended hereto. The quantities of catalyst and zinc oxide given are suitable for pilot plant operation.

Esso Grade A naphtha and water after passing through meter pumps are vaporised and superheated to 350° C. to 500° C. in a gas fired lead bath before mixing together at the inlet to an upward flow reactor containing catalyst (3 cu. ft.) made up in the form of ⅛" pellets. The desulphiding process proceeds at a temperature of from 350° C. to 500° C., and the emergent gases passed through a bed of zinc oxide granules (1 cu. ft.) at a temperature of 400° C. to remove the $H_2S$. The desulphided product is cooled and the water is separated out by means of a decanter.

The invention is further illustrated by the following examples.

(I) PREPARATION OF CATALYSTS

Example 1

The following example is applicable to the preparation of a wide range of catalysts according to the invention, depending on the nature of the carrier used.

The support (which may be, for example, constituted by silica, magnesium silicate or kaolin in finely divided state or already compounded into shaped carriers such as granules or rings in a manner well known in the art, powdered brick or a finely divided oxide of magnesium, calcium, barium or strontium), is impregnated with an aqueous solution of uranyl nitrate. The mixture is filtered and the residue heated to a temperature not exceeding 500° C. Where the burnt carrier now having deposited upon it $U_3O_8$ is in a powdered or finely divided condition, it is finally mixed with a binding material and pelleted. Depending upon the porosity of the support the amount of uranium oxide catalyst present may be up to 5 to 10 percent of the total weight of the catalyst.

If a larger amount of uranium oxide is desired, the process of impregnation and firing may be repeated.

Example 2

The process of the preceding example is repeated using shaped supports and a melt or uranyl nitrate made by heating the solid until it dissolved in its own water of crystallisation. The support was then fired at 500° C. until all the nitrate had decomposed to the oxide.

Example 3.—Preparation of a catalyst precursor

Shaped catalyst supports, consisting of 4 mm. granules with an apparent porosity of 42–60%, and internal specific area of 1–10 m.²/g. were dried, then dipped in a melt of uranyl nitrate made by heating the solid until it dissolves in its own water of crystallisation. The impregnated supports are dried at a temperature not exceeding 105° C., and then dipped in a solution of ammonia (10%) and dried.

On heating for up to 4 hours at 100° C. to 150° C. the ammonium diuranate formed on the support decomposes to give uranium trioxide.

Analysis showed 7% uranium as $UO_3$.

Example 4

The support and $UO_3$ are ground separately to very fine powders, e.g. having a particle size in the range of 5 to 25μ and mixed in a mixing mill. The mixed powders are granulated by the standard methods of granulation, e.g. using starch or methyl methacrylate dissolved in trichloroethylene screened and then pelleted to pellets of a size from 50 to 150 mesh. Aluminum stearate is added as a lubricant (1 to 2%) in the pelleting process. Alternatively, 1 to 2% graphite may be used as lubricant.

Example 5

Instead of adding the solid support to the solution or uranium salt, the support may be precipitated in situ. A mixture of sodium silicate and uranyl nitrate are heated together. Silica of a high surface area together with uranium trioxide deposited on the surface thereof are precipitated out. The sodium nitrate formed in the course of the reaction is removed by filtration and washing. The catalyst precipitate is granulated and pelleted in the manner indicated in Example 4.

Where other soluble inorganic salts are incorporated to increase the surface area of the silica, the same are washed out in the same manner as the sodium nitrate.

(II) THE DESULPHIDING PROCESS

Example 6

A petroleum fraction with an end boiling point of 140° C. containing 70 p.p.m. organic sulphur was vaporised in a heat exchanger. Steam was fed into the hydrocarbon vapour in the ratio of 1 lb. water per gallon of petroleum fraction. The mixture was heated to a temperature in the order of 480° C. and admitted into a tube 2″ internal diameter and 10 ft. long containing 5 litres of catalyst and operating at atmospheric pressure. The catalyst was in the form of ⅛″ granules of magnesium silicate support commercially known as sepiolite impregnated with uranoso-uranic oxide (10.7% uranium) calcined at 450° C.

The tube was contained in an electrically heated furnace and maintained at the temperature required for the reaction.

The mixture of steam and hydrocarbon vapour and $H_2S$ was then passed to the base of a 2″ internal diameter tube for subsequent $H_2S$ removal.

The mixture of steam and hydrocarbon vapour was then fed to a condenser and subsequently to storage drums.

Using the above described plant the following results were obtained:

| Hydrocarbon feed rate, gals./hr. | Steam feed rate, lbs./hr. | Catalyst temp., ° C. | Product organic sulfur, p.p.m. |
|---|---|---|---|
| 0.5 | 0.5 | 480–500 | 1.5 |
| 1.0 | 1.0 | 480–500 | 4.5 |
| 1.5 | 1.5 | 480–500 | 4.4 |
| 2.0 | 2.0 | 480–500 | 4.5 |
| 2.5 | 2.5 | 480–500 | 4.4 |
| 3.0 | 3.0 | 480–500 | 4.9 |
| 4.0 | 4.0 | 480–500 | 5.5 |
| 5.0 | 5.0 | 480–500 | 6.0 |
| 6.0 | 6.0 | 480–500 | 11.0 |
| 1.0 | 1.0 | 350–360 | 15.0 |
| 1.0 | 1.0 | 325–335 | 16.0 |
| 1.0 | 1.0 | 290–320 | 16.5 |
| 1.0 | 1.0 | 275–395 | 17.5 |

The content of unsaturated hydrocarbon compounds was not substantially increased.

Example 7

A petroleum fraction with an end boiling point of 125° C. containing 115 p.p.m. of organic sulphur was vaporised in a heat exchanger. Steam was fed into the line conducting the hydrocarbon vapour and the mixture was heated to a temperature of the order of 400° C. The mixture was admitted into a tube of 4″ diameter and 10′ long, containing 3/16″ diameter by 3/16″ long beads of uranium oxide catalyst (10.4% $U_3O_8$) on an aluminum oxide support the tube being contained in a gas-fired furnace maintained at the temperature required for the reaction. The mixture of steam and hydrocarbon vapour and $H_2S$ was then passed to the base of a 6″ diameter scrubbing tower containing 15′ of Raschig Rings and subsequently to a condenser. The condensed material was led to storage drums. A solution of sodium vanadate and sodium salt of anthraquinone disulphonic acid was passed down the scrubbing tower for the purpose of removing hydrogen sulphide from the vapour mixture and collected in a tank at the base of the tower. Air was blown into the tank to regenerate the liquor, and the hot liquid subsequent to this aeration treatment was recycled by a pump to the top of the scrubbing tower. The uranium oxide catalyst bed in the tube had a volume of 1 cu. ft.

Using the above described plant the following results were obtained.

| Hydrocarbon feed rate gals./hr. | Steam feed rate, lbs./hr. | Catalyst temperature, ° C. | Pressure, p.s.i.g. | Product organic sulphur, p.p.m. |
|---|---|---|---|---|
| 2.6 | 3.6 | 430–440 | 50 | 4.6 |
| 10 | 10 | 430–440 | 15 | 15.2 |
| 3.1 | 4 | 390–440 | 200 | 7.0 |

The content of unsaturated compounds was not substantially increased.

Example 8

3 cu. ft. of the uranium oxide catalysts on aluminium oxide support in the form of 3/16″ x 3/16″ pellets were charged into a catalyst vessel.

A commercially available petroleum feedstock of the following general specification:

| | |
|---|---|
| Specific gravity | 0.64–0.73 |
| Final B.P. ° C | 160 |
| Aromatics max. percent | 8 |
| Olefines and naphtha do | 1 |
| Sulphur max. do | .03 |
| Unreactive sulphur do | .01 |
| C:H | 4.7–5.8 | was fed to this vessel with steam at atmospheric pressure. The product gases and vapours were passed through either a liquid purification unit as in Example 1 or through a vessel containing zinc oxide pellets (both purification steps being equally effective) after which the vapours were condensed and run to a storage tank. Approximately 20,000 gallons of this feedstock has been processed in this manner and typical results are shown as follows:

| | |
|---|---|
| Petroleum feedrate gallons per hour | 12 |
| Water feedrate lbs./hr | 12 |
| S content feed p.p.m. w./v | 109 |
| S content product p.p.m. w./v | 2 |
| Reactor temperature ° C | 460–480 |

We claim:

1. A process whereby organic sulphur compounds are removed from hydrocarbons in the vapor phase wherein the hydrocarbons are treated with steam at elevated temperatures in the presence of a bed of catalyst comprising a catalyst support and at least one member of the group consisting of uranoso-uranic oxide, $U_3O_8$, uranium trioxide and mixtures thereof.

2. A process as claimed in claim 1 whereby organic sulphur compounds are removed from hydrocarbons in the vapor phase, which process comprises the step of treating the hydrocarbons with steam at temperatures above 350° C. in the presence of a catalyst which comprises uranoso-uranic oxide, $U_3O_8$, on an aluminum oxide support.

3. A process as claimed in claim 1 wherein the total uranium oxide content of the catalyst is from 5 percent to 20 percent.

4. A process as claimed in claim 1 wherein the carrier comprises at least one member of the group consisting of alumina, silica, kaolin, magnesium silicate, powdered brick, magnesium oxide, calcium oxide, strontium oxide and barium oxide.

5. A process as claimed in claim 1 in which the hydrocarbons are reacted with a quantity of steam of from ½ to 6 lbs. per gallon of hydrocarbon feedstock (in liquid form).

6. A process as claimed in claim 2 wherein the hydrocarbons are passed through a catalyst bed in vapor form with a quantity of steam of 1–2 lbs. per gallon of liquid hydrocarbons.

7. A process as claimed in claim 1 wherein the temperature of the reaction is in the range 350° C. to 500° C.

8. A process as claimed in claim 1 which is carried out at a pressure of from atmospheric pressure to 200 p.s.i.g.

9. A process as claimed in claim 1 in which the products on leaving the catalyst bed are passed through a hydrogen sulphide removal unit.

References Cited

UNITED STATES PATENTS

| | | | |
|---|---|---|---|
| 3,367,862 | 2/1968 | Mason et al. | 208—243 |
| 3,091,605 | 5/1963 | Hull et al. | 252—467 |
| 1,562,480 | 11/1925 | Wietzel et al. | 252—467 |
| 1,900,882 | 3/1933 | Lusby | 252—467 |
| 2,995,511 | 8/1961 | Herbert et al. | 208—216 |
| 2,891,003 | 6/1959 | Chervenak et al. | 208—216 |

FOREIGN PATENTS 511,398   8/1939   Great Britain.

DELBERT E. GANTZ, Primary Examiner

J. M. NELSON, Assistant Examiner

U.S. Cl. X.R.

252—467